Nov. 29, 1960  R. E. HORTON ET AL  2,961,760
STRUCTURAL SANDWICH SPACER ASSEMBLIES
Filed March 26, 1956
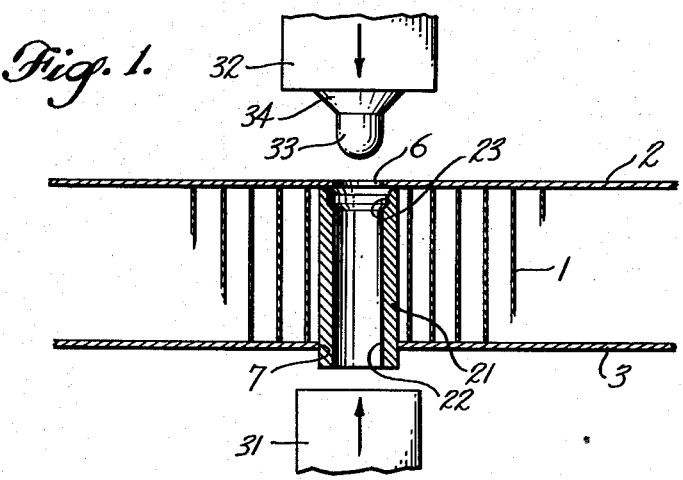
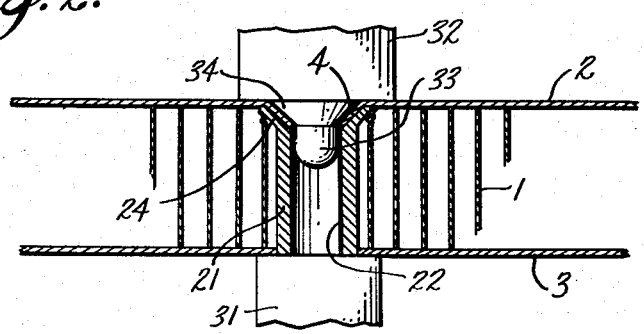
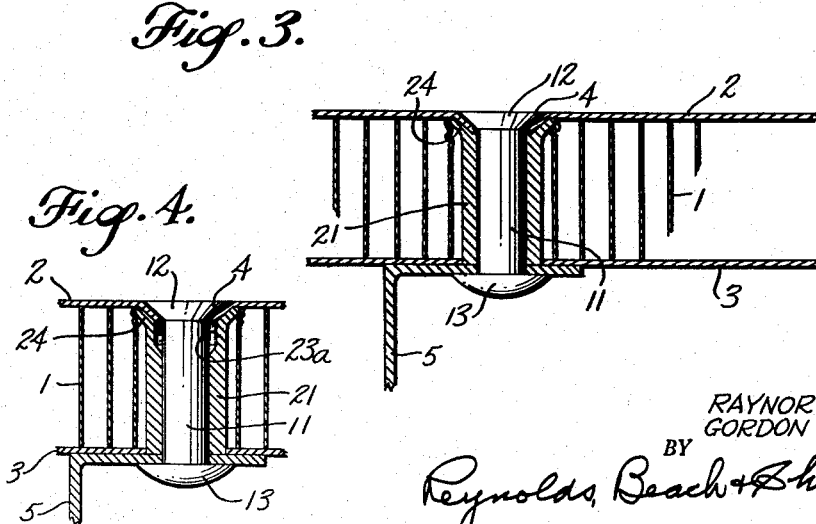
INVENTORS.
RAYNOR E. HORTON
GORDON G. SCHIMEL
BY
Reynolds, Beach & Christensen
ATTORNEYS United States Patent Office 2,961,760
Patented Nov. 29, 1960

2,961,760

STRUCTURAL SANDWICH SPACER ASSEMBLIES

Raynor E. Horton, Bellevue, and Gordon G. Schimel, Seattle, Wash., assignors to Boeing Airplane Company, Seattle, Wash., a corporation of Delaware Filed Mar. 26, 1956, Ser. No. 573,834

2 Claims. (Cl. 29—455)

The present invention relates to a honeycomb sandwich structure such as is used in aircraft construction, for example, and deals with a method for securing an element to such a sandwich structure without so damaging the latter, within a localized area of such a sandwich, to an extent that it will not sustain structural or other loads. The present invention is related to the blind sandwich spacer which is disclosed in the abandoned copending joint application of R. E. Horton, one of the present inventors, and W. B. Sander, Serial No. 568,904, filed March 1, 1956.

Whereas in the Horton and Sander disclosure the expander element is left in place within the assembly, according to the present invention the expansion of the spacer sleeve is accomplished by an expander tool, as a preliminary operation, prior to the installation of the bolt or rivet, which latter may be of conventional type, and no expander element is left within the completed assembly, thereby saving somewhat in expense and in weight. Also, differing from the Horton and Sander disclosure, the expansion is not solely to effect radial expansion of a spacer sleeve, but conjointly to effect such radial expansion and axial shortening of that spacer sleeve.

The present invention is particularly useful in the employment of a rivet with a countersunk head, or an equivalent element, such as a bolt (which is intended to be comprised within the term "rivet"), to hold an applied element to a structural sandwich, and affords the ability to make a well defined dimple in a face of the sandwich, wherein all the dimpled area has full support, and is clamped tightly, in use, yet the cross-sectional area of the internal sleeve employed is of less diameter, to start, than the diameter of the ultimate dimple. The sleeve's external diameter should be the minimum consistent with the required strength, hence the sleeve is of minimum weight. The sharp definition of the dimple, by the use of the preferred form of this invention, avoids deformation of the material of the sandwich face outside the dimpled area, and avoids excessive deformation of the core, confining that deformation substantially to the space occupied by the dimple itself. Obviously, the core deformation is less than would occur with a sleeve of larger diameter, and is localized in the region of the dimple.

By this invention, in addition to the advantages mentioned above, the upper (dimpled) sandwich face is supported from below, throughout and after its formation, over the entire area of the dimple, and can resist adequately concentrated vertical (axial) loadings; the face within the dimple, being clamped tightly, as stated above, resists loads acting parallel to the plane of the face. This tight clamping also increases resistance to rivet pull-out.

The assembly according to the method of this invention has been successfully used, in the preferred form, to support the installation of various types of structural rivets, and even in the alternative form, is adequate to support all non-structural loads.

The invention herein disclosed and claimed concerns the method of assembly of the structural sandwich with the applied or secured element by means of a rivet, whereby an applied element can be secured to a structural sandwich of the kind described.

The drawings illustrate successive stages in the installation of a sandwich spacer according to a preferred form of the present invention, and also an alternative form, for lighter loads.

Figure 1 is a view axially of the spacer sleeve and through the plane of the sandwich, illustrating a first stage in the method; Figure 2 is a similar view illustrating a second stage, and Figure 3 is a similar view illustrating the completed installation.

Figure 4 is a view similar to Figure 3, but illustrating an alternative form, suited to support nonstructural loads.

The sandwich illustrated is such as includes a honeycomb core 1 of metal foil or the like, such for instance as is illustrated in the patents to Steele No. 2,610,934, to Del Mar No. 2,608,500, and to Pajak No. 2,609,068. Face plates 2 and 3, usually sheets of metal, are bonded or otherwise attached to the foil edges at the opposite surfaces of the core, to make up the structural sandwich. It may be assumed that it was not known in advance where it would be necessary to locate a structural rivet, or to secure an element such as a clip or bracket 5, and that upon determining the proper location, the sandwich was bored to provide a through aperture, but one which, as in the Horton and Sander application, has a smaller aperture 6 at one face plate—for instance, the face plate 2—and a larger aperture 7 at the opposite face plate 3. The aperture 6 is desirably of a size to snugly embrace the shank 11 of a bolt or rivet which is to be used in securing the bracket 5 to the sandwich, after the dimpling operation is completed, and the aperture 7 is enough larger to admit a spacer sleeve 21 which itself surrounds the rivet shank, but which is desirably of lesser diameter than the head 12 of such a rivet.

The sleeve 21 has a bore 22 which is of a size, at one end, and for the greater part of its length, to snugly receive the shank 11 of the bolt or rivet, and at its other end, the bore 22 is counterbored to a diameter 23 enough larger that the wall of the sleeve becomes thin enough to deform readily. If the sleeve's wall at this end is thin enough, without counterboring, to be deformed readily, it need not be counterbored. It should be of malleable material in this portion, at least.

The depth of the counterbore 23 should be just sufficient, in the preferred form, that no space is left after subsequent deformation of the sleeve. In the alternative form, Figure 4, this need not be so. The spacer sleeve 21 is of a length according to this invention, and contrary to the Horton and Sander disclosure, that when inserted so that its one end contacts the inner surface of the face plate 2 having the smaller aperture 6, the opposite end of the sleeve 21 will still protrude somewhat beyond the exterior face of the face plate 3. The sleeve is shown so installed in Figure 1. The inserted end is the end which is counterbored.

Thereupon the one end of the sleeve 21 is engaged by a bucking tool 31, and a punch 32, cold or heated, and suitably formed to fit within the larger bore 23 of the spacer sleeve 21, is engaged with the opposite face plate 2. For instance, a centering stud 33 of a size to enter the aperture 6 and to fit snugly within the bore 22 is followed by a dimpling or countersinking portion 34, whereby when the punch 32 and the bucking tool 31 are urged together, as indicated by the arrows in Figure 1, the deformable or thin-walled portion of the spacer sleeve 21 will be expanded radially and deformed, and at the same time, the face plate 2 will be countersunk or dimpled, as indicated in Figure 2. Also, at the same time, the spacer sleeve 21 will be urged inwardly into the sandwich, and shortened axially, until its end which is engaged by the bucking tool 31 comes flush with the exterior surface of the face plate 2, while the expanded portion 24 of the spacer sleeve is expanded radially within the dimple 4 of the face plate 2. The axial force urges the periphery of the expanded portion 24 against the underside of the sheet 2, insuring a sharp delineation of the dimple therein. When the dimpling is completed, in the preferred form, a well defined dimple is left in the face 2, and its interior or undersurface is supported over its entire area by the deformed metal of the sleeve. The depth of the counterbore is preferably just sufficient to attain this result, although as stated above, this is not essential in the alternative form of Figure 4.

Now, the punch 32 and the bucking tool 31 are withdrawn, the shank 11 of a bolt or rivet is inserted through the sandwich, the spacer sleeve 21, and the bracket 5, with its head 12 seated within the dimple 4, and a head 13 is applied to or upset upon its opposite end as in Figure 3, in the normal manner, and the installation is complete.

It will be seen that when the installation is thus completed the heads 12 at one end and 13 at the other end clamp the spacer sleeve 21 securely, and the latter holds the heads against further approach, precluding undesired deformation of the sandwich. The spacer sleeve reinforces the sandwich at the point of application of the stress, and the entire area of the dimple is clamped firmly between the rivet's head and the upset portion of the sleeve. This strongly holds all parts securely, in use.

In the preferred construction so far described, the counterbore 23, if there be one initially, must be of such slight depth as to disappear when the sleeve's end has been deformed by application of axial compression and the spreading effect of the dimpling surface 34. Otherwise the inner margin of the dimple 4 is left without support from the sleeve. This requires somewhat careful coordination of the initial length of the sleeve 21 with the thickness of the sandwich, and of the depth of the counterbore with the ultimate size and shape of the dimple. Such is preferable, where structural loads are applied, but is not needed for non-structural loads, and if the counterbore 23a (Figure 4) is made of somewhat excess depth, no harm will result in non-structural assemblies, and there need not be such care exercised in the selection and use of the precisely correct sleeve length. Expense is saved thereby.

It will be noted that the sleeve 21 is of an external diameter, initially throughout, and ultimately in all except its deformed end, less than the diameter of the rivet's head 12. This saves metal and weight, and because the deformation is localized, it saves unnecessary deformation or destruction, and consequent weakening, of the sandwich core material 1, which is quite flimsy, except in the aggregate and as assembled with its faces.

While a rivet type of securement has been illustrated, it will be obvious that, similarly to the Horton and Sander disclosure, a bolt type of securement might readily be employed. It is of the essence of this invention that the one end of the spacer sleeve be deformed and expanded radially outwardly within the inner face of the one face plate, and the spacer sleeve be shortened axially, in order that its opposite end may come flush with the exterior face of the opposite face plate.

We claim as our invention:

1. A method of securing an applied element to a structural sandwich composed of a crushable core interposed between and attached to opposite skins, by means of a rivet which has a countersung head, which method comprises boring a hole through the sandwich to leave a hole in one skin of a diameter corresponding to the diameter of the rivet's shank, forming said hole at the second skin and through the core of somewhat larger diameter, inserting a sleeve, one end whereof at least, is deformable, through the larger hole, said sleeve being of a diameter to snugly fit that larger hole, and of a length and inserted to a depth to contact by its deformable end the inner surface of the skin which has the smaller hole, and to leave its other end protruding somewhat from the skin which has the larger hole, applying an axial compressive force to the opposite ends of the sleeve, meanwhile filling the sleeve's bore at its deformable end, to shorten the sleeve until its initially protruding end comes flush with the skin, and to spread radially outward its deformable end to match the countersunk head of the rivet to be employed, inserting a rivet shank through the sleeve and sandwich, with its countersunk head clamping the skin against the deformed end of the sleeve, and heading the opposite end of the rivet to bear against the applied element and through the latter against the initially protruding but now flush end of the sleeve, and against the skin surrounding such end.

2. A method as in claim 1, which includes the step of dimpling the skin which is in contact with the deformable end of the sleeve, simultaneously with deformation thereof, for the reception of the rivet's head upon insertion of the latter.

References Cited in the file of this patent

UNITED STATES PATENTS

| | | |
|---|---|---|
| 1,706,118 | Hopkins | Mar. 19, 1929 |
| 2,060,970 | Belden | Nov. 17, 1936 |
| 2,296,470 | Keehn | Sept. 22, 1942 |
| 2,585,557 | Kreimendahl | Feb. 12, 1952 |
| 2,607,447 | Tuttle | Aug. 19, 1952 |
| 2,767,877 | Newsom | Oct. 23, 1956 |